United States Patent [19]

Punt

[11] Patent Number: 5,065,701
[45] Date of Patent: Nov. 19, 1991

[54] NECK HOLDING DEVICE FOR LIVESTOCK

[76] Inventor: Harvard A. Punt, RR, Hull, Iowa 51239

[21] Appl. No.: 590,966

[22] Filed: Oct. 1, 1990

[51] Int. Cl.⁵ .............................................. A01K 1/00
[52] U.S. Cl. ................................................ 119/147.1
[58] Field of Search ....................... 119/147.1, 148, 98, 119/99

[56] References Cited

U.S. PATENT DOCUMENTS

| | | | |
|---|---|---|---|
| 2,113,741 | 4/1938 | Peterson | 119/99 |
| 3,087,195 | 4/1963 | Marshall et al. | 119/99 |
| 3,092,871 | 6/1963 | Marshall et al. | 119/99 |
| 3,513,812 | 5/1970 | Iverson et al. | 119/98 |
| 4,059,073 | 11/1977 | Roark | 119/98 |
| 4,947,800 | 8/1990 | Widney | 119/99 X |

*Primary Examiner*—Gene Mancene
*Assistant Examiner*—R. Thomas Price

[57] ABSTRACT

A holding device for temporarily extending the neck of an animal and holding the head still for veterinary treatment including double stanchion-like gates adapted to be engaged on both sides of the neck of the animal. One of the double gates is movable away from the other so that the neck is exposed between the two gates. Separation of the gates is caused by hydraulic means adapted to move one gate away from the other.

5 Claims, 3 Drawing Sheets

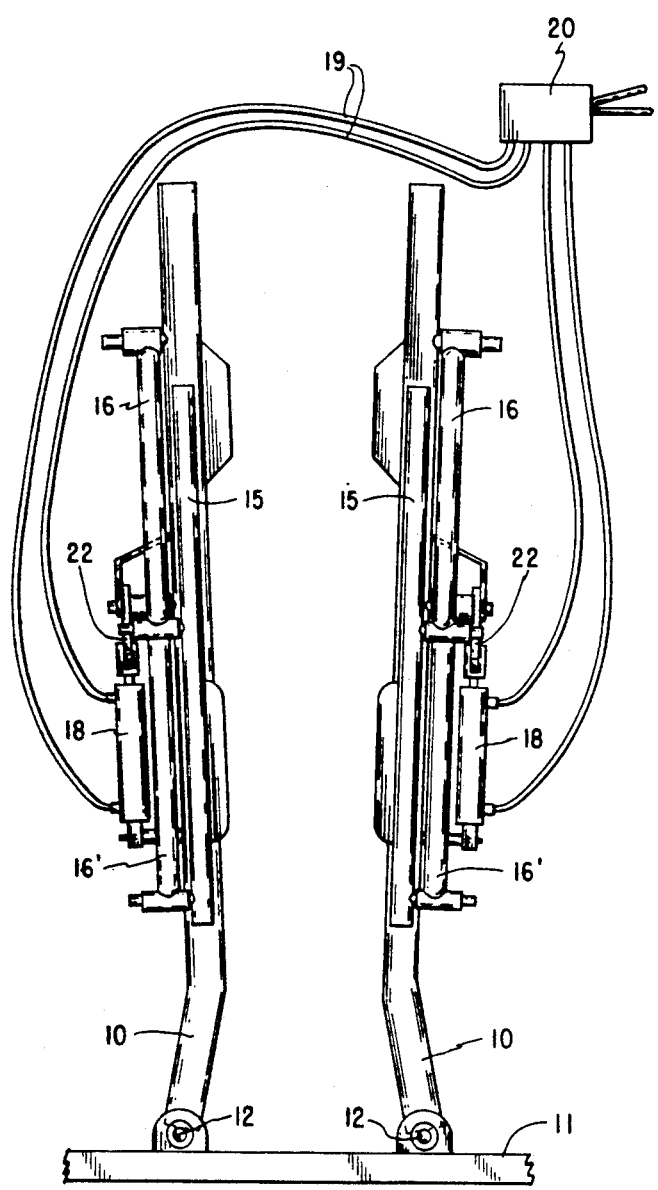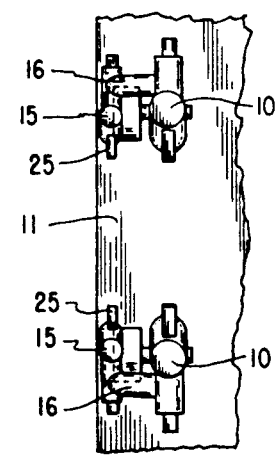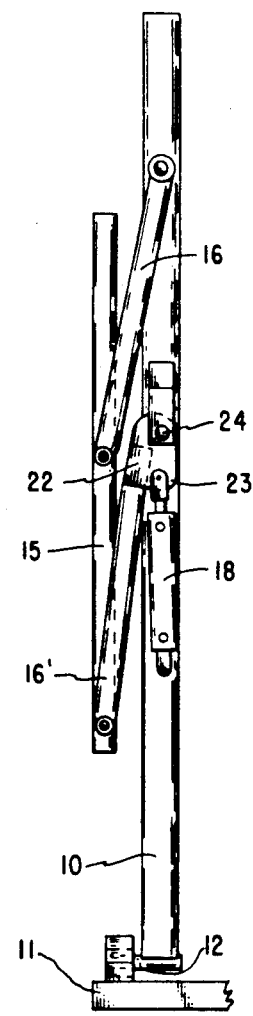
FIG. 1
FIG. 2
FIG. 3

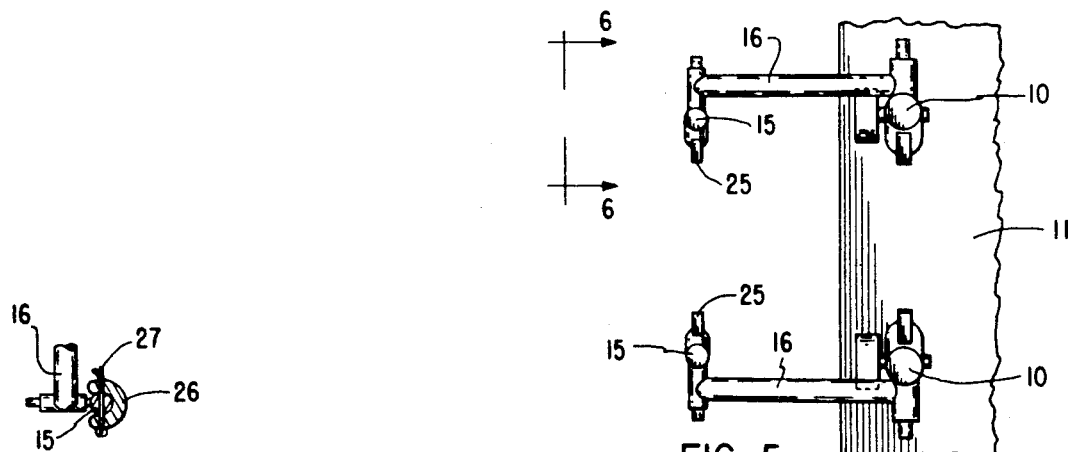
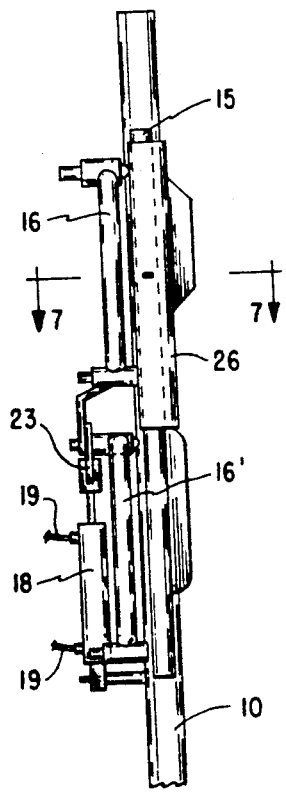
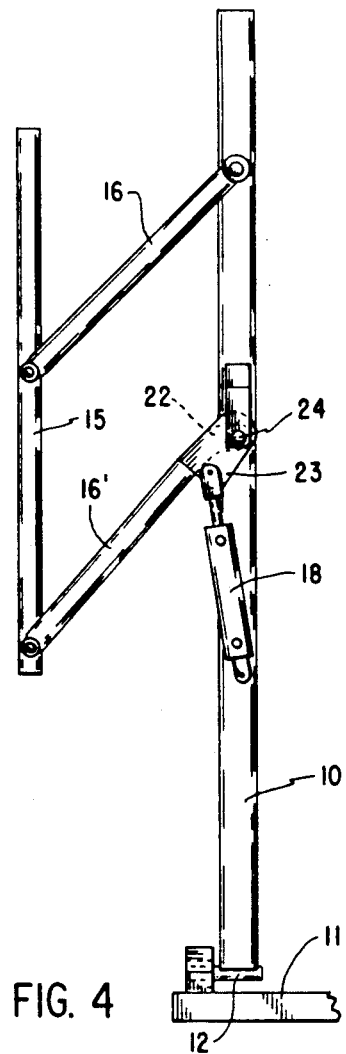

NECK HOLDING DEVICE FOR LIVESTOCK

BACKGROUND AND SUMMARY OF THE INVENTION

This invention pertains to devices for holding the heads of certain domesticated livestock during veterinary treatment, and more particularly to such a device having a stanchion not only at the shoulder but also an extendible stanchion adapted to extend the neck of the animal.

In the veterinary treatment of certain livestock, particularly cattle but also other animals, there are times when the head of the animal must be held firmly to avoid physical damage. Such treatment as applying ear tags, or applying implants of either medicaments or growth hormones in an ear are much more safely accomplished if the head of the animal is substantially immobilized. The same is true of examination of the eyes, ears or teeth of the animal. It is also highly desirable that the neck of the animal be fully exposed, and nearly motionless when taking blood samples from or making injections of any kind of serum into the neck of the animal.

The present methods of accomplishing the holding of the animal's head all require substantial human power. Nearly all of the methods include use of a stanchion either fixed or as part of a portable chute such as those used for dehorning. The animal is held in the stanchion to keep the body of the animal fairly tightly confined. Then, a tray or platform may be placed under the head of the animal and the head pressed against the tray to hold it. An alternative presently used includes the use of fixed length arms extending from the stanchion gate. These arms are put in place on the chute and are not adjustable and generally need to be used with a nose ring and rope. If the animal becomes excited, it is necessary with this type of device, for someone to hold the head until the nose ring is inserted and the rope tied before the desired procedure can be carried out. Another alternative is the use of a nose ring in the nose of an animal and held by means of a pair of ropes attached to the ring.

By my invention, I provide a power assisted device which can be quickly and easily operated by one person. The device is both safe and humane and causes far less distress for the animal because of the speed of the operation.

Where currently for blood sampling a nose clamp and rope mechanism is usually used to stretch the neck, my device allows a simple nudge and holding action of the cheeks and ears of the animal. After a short time the holding is quickly released without bruising or other physical injury when the procedure is completed. In implanting procedure, current methods are so lax that only about a 60% to 70% accuracy rate is achieved. By the use of my invention which achieves the near-total immobility of the head, accuracy is greatly increased and the procedure is completed more quickly with greatly less stress on the animal.

All of the benefits are accomplished by the mechanics of my invention which is fully described in reference to the drawings described below.

BRIEF DESCRIPTION OF THE DRAWINGS

FIG. 1 is a front elevational view of the mechanism of my invention in place on an ordinary stanchion gate and in a retracted position, FIG. 2 is a side elevational view of the mechanism shown in FIG. 1, FIG. 3 is a top view of the mechanism shown in FIG. 1, FIG. 4 is a view similar to FIG. 2 with the mechanism in an extended position, FIG. 5 is a top plan view similar to FIG. 3 with the mechanism extended as in FIG. 4, FIG. 6 is a partial view from 6—6 of FIG. 5 showing a spacer sleeve in place, FIG. 7 is a sectional view from line 7—7 of FIG. 6.

DESCRIPTION

Figure 9:
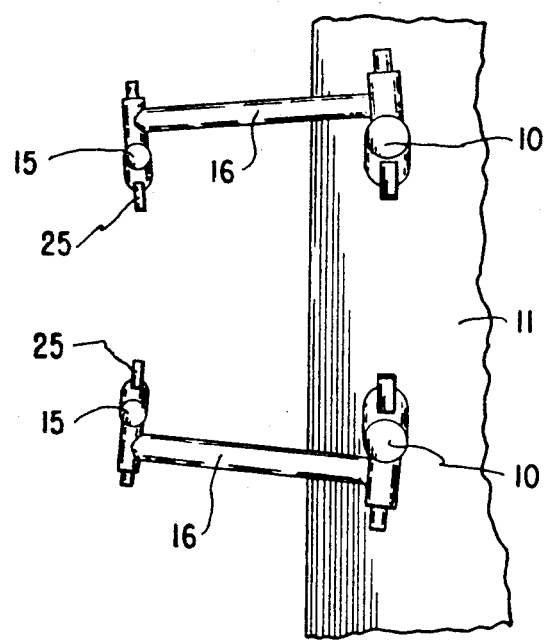
FIG. 9 is a view similar to FIG. 5 of the embodiment of FIG. 8.

Briefly, my invention comprises a secondary gate pivotally attached to a stanchion gate and operated by hydraulic power to extend the neck of an animal for treatment or the like.

More specifically, my device is adapted to be mounted on a stanchion gate. This kind of gate comprises a pair of neck-engaging pillars 10 pivotally mounted on a base 11 by pins 12. The base 11 may be fixed or may be a part of a trailer device such as a de-horning chute for cattle. The pillars 10 may be normally spread in an open position but can be pivotally moved closer together to a holding position. In the holding position, the pillars are engaged with the side of the animal's neck and are close enough together that they prevent removal of the head of the animal or passage of its shoulders. In this way, the animal is restricted from motion while being de-horned or while other veterinary procedures are carried out. The pillars may be moved from one position to another by any conventional means (not shown).

My device is designed to hold the animals head somewhat more restricted for a short time for procedures particularly affecting the head or neck. Application of ear tags or implantations in the animals ears are good examples of such procedures.

In order to accomplish that holding, I provide a pair of auxiliary bars 15 fastened to the pillars 10 by means of links 16 and 16' forming a parallelogram linkage. The means to move the bars 15 transversely to the movement of said pillars 10 includes a pair of hydraulic cylinder and piston assemblies 18, one connected with each auxiliary bar. These are preferably double acting devices and are operated from any convenient source of hydraulic fluid under pressure. The fluid is conducted to the piston/cylinder assemblies through tubes 19 leading from control means 20. In order to make certain that both auxiliary bars move equally, it is very important that the pressure to each assembly is equalized. Therefore, it is essential that part of the control means includes a pressure equalizer of a type well known in the art. The controls also include a variably controllable device over a range of pressures to control the speed of movement of the bars. Thus, for safety purposes, both the pressure and the speed of movement are affirmatively controlled to avoid injury to the animal.

The hydraulic means is connected to a control member 22 on which the lower link 16' is mounted. This member includes an attachment ear 23 to which the hydraulic mechanism is connected, and which is always displaced slightly from the pivotal connection 24 to the pillar 10. Thus, pressure in the cylinder will cause force on the ear 23 and thus will rotate the control member 22 and cause the link 16' to be extended. Obviously, when the piston is retracted into the cylinder of the hydraulic mechanism the link 16 will be pulled back against the pillar 10.

In order to protect the neck and head of the animal, some padding on the auxiliary bars 15 may be desirable. This padding may be provided in any of several ways. In the embodiment of FIGS. 1-5, this padding may take the form of a strip 25 of relatively soft material embedded in the bars 15. An alternative form—and the preferable one—is shown in FIGS. 5 and 6. Here, a sleeve 26 of soft padding, such as a foamed material, is wrapped around the auxiliary bar 15. The sleeve may be fastened in place by a split key 27 or any other convenient means.

Figure 8:
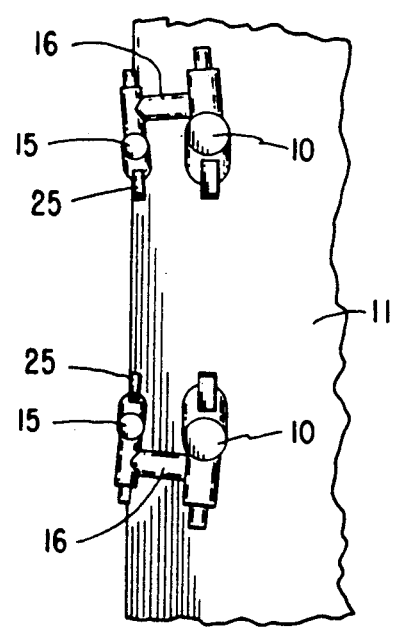
FIG. 8 is a view similar to FIG. 3 of an alternative embodiment.

In FIGS. 8 and 9, I illustrate a slightly modified device embodying my invention. In this alternative, the links 16 and 16' are directed slightly inward. The reason for the altered direction is so that the spacing between the bars 15 will be slightly narrower than between the pillars 10. This spacing recognizes that the head of the animal is somewhat narrower than its shoulders. The head, therefore, might slip between the bars 15 if they were too widely spaced.

In use, the animal to be worked on is first secured in the stanchion gate by closing the pillars 10 around its neck. At that time, the auxiliary bars 15 are retracted against the pillars and thus on lie each side of the neck of the animal. By operation of the hydraulic mechanism 18 from the controls 20, those bars may be extended to move the head of the animal straight ahead away from the body of the animal. This action can be adjusted as to speed and pressure so that there is no injury to the animal. When the neck is extended, the injection, implantation or other procedure can be accomplished quickly so that any discomfort to the animal is held to a minimum. As soon as the procedure is completed the bars can be retracted and the gate opened to release the animal and make ready for the next one.

Thus, my device avoids any need for nose clamps, ropes or the like to hold an animal for any of several veterinary procedures.

I claim as my invention:

1. In combination with a stanchion gate having vertical members for holding the head and neck of an animal, means for extending said neck comprising a pair of auxiliary bars extendibly attached to said vertical members and engageable with said head of said animal, said bars being moveable transversely of said gate and in a direction to move said head away from said gate, separate power means connected between said gate and each of said bars to move said bars transversely of said gate, each of said separate power means being connected between said gate and one of said pair of bars, and control means adapted to control said power means to cause each of said bars to move at the same rate as the other.

2. The combination of claim 1 in which each of said power means includes a hydraulic piston and cylinder assembly connected between said gate and one of said bars, said control means acting to equalize the pressure in each said cylinder.

3. In combination with a stanchion gate having vertical members for holding the neck and head of an animal, means for extending said neck comprising auxiliary bars, links engaged between each of said bars and an adjacent vertical member to form a parallelogram linkage, said bars being engageable with the head of said animal, said bars being thereby moveable transversely to said gate and in a direction to move said head away from said gate, said parallelogram linkage being effective to hold said bars in substantially parallel position to the vertical member to which it is linked, and power means connected between said gate and said bars to move said bars transversely of said gate.

4. The combination of claim 3 in which said links are directed so that the bars when extended are more closely spaced than when retracted.

5. The combination of claim 3 in which said auxiliary bars are opposite to each other, padding means on each of said bars, said padding means being placed on said bars so that said padding means on each bar faces the padding means on the opposite bar, said padding means thus being adapted to lie between said bar on which it is fixed and said neck of the animal being held.

* * * * *